US009784623B2

(12) United States Patent
Palanchoke et al.

(10) Patent No.: US 9,784,623 B2
(45) Date of Patent: Oct. 10, 2017

(54) BOLOMETRIC DETECTOR WITH MIM STRUCTURES OF DIFFERENT DIMENSIONS

(71) Applicant: Commissariat A L'Energie Atomique et aux Energies Alternatives, Paris (FR)

(72) Inventors: Ujwol Palanchoke, Marseilles (FR); Salim Boutami, Grenoble (FR); Stephane Pocas, Grenoble (FR); Wilfried Rabaud, Villard le Lans (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/865,564

(22) Filed: Sep. 25, 2015

(65) Prior Publication Data

US 2016/0091371 A1     Mar. 31, 2016

(30) Foreign Application Priority Data

Sep. 26, 2014 (FR) ..................................... 14 59157

(51) Int. Cl.
*G01J 5/20* (2006.01)
*G01J 5/22* (2006.01)
*G01J 5/08* (2006.01)

(52) U.S. Cl.
CPC ............... *G01J 5/22* (2013.01); *G01J 5/0853* (2013.01); *G01J 5/20* (2013.01); *G01J 2005/202* (2013.01)

(58) Field of Classification Search
CPC ....................................................... G01J 5/22
See application file for complete search history.

(56) References Cited

U.S. PATENT DOCUMENTS

| 2008/0265164 A1* | 10/2008 | Ouvrier-Buffet | ......... G01J 5/20 250/338.4 |
| 2014/0042324 A1* | 2/2014 | Kropelnicki | .............. G01J 5/02 250/340 |

(Continued)

FOREIGN PATENT DOCUMENTS

| FR | 2 977 937 A1 | 1/2013 |
| FR | 2 994 596 A1 | 2/2014 |
| WO | WO 2013/010933 A1 | 1/2013 |

OTHER PUBLICATIONS

U.S. Appl. No. 14/677,222, filed Apr. 2, 2015, Alain Gliere et al.

(Continued)

*Primary Examiner* — Edwin Gunberg
(74) *Attorney, Agent, or Firm* — Oblon, McClelland, Maier & Neustadt, L.L.P.

(57) ABSTRACT

A bolometric detector of LWIR wavelengths, including:
  a substrate;
  a membrane suspended above the substrate by supporting elements;
  an absorbing element comprising several MIM structures each formed with a lower metal element, an upper metal element specific to each MIM structure and with a dielectric element positioned between the lower and upper metal elements;
  a thermometric element comprising at least one thermometric material;
wherein:
  the membrane includes the upper metal element, the thermometric material and one portion of the dielectric element of each MIM structure,
  the upper metal elements of at least two MIM structure have different dimensions relatively to each other in the main plane of the membrane, and (Continued)

the dielectric element of each of the MIM structures includes at least one of the following materials having vibrational modes in the LWIR range: $Al_2O_3$, AlN, $TiO_2$.

18 Claims, 8 Drawing Sheets

(56) References Cited

U.S. PATENT DOCUMENTS

| | | |
|---|---|---|
| 2014/0049812 A1 | 2/2014 | Palanchoke et al. |
| 2014/0175284 A1 | 6/2014 | Roh et al. |
| 2014/0226021 A1* | 8/2014 | Koechlin .......... G01J 5/08 348/165 |
| 2014/0319350 A1 | 10/2014 | Yon et al. |
| 2015/0226612 A1 | 8/2015 | Palanchoke et al. |

OTHER PUBLICATIONS

U.S. Appl. No. 14/857,223, filed Sep. 17, 2015, Julien Favreau et al.

French Preliminary Search Report issued Jun. 16, 2015 in French Application 14 59157, filed on Sep. 26, 2014 ( with English Translation of Categories of Cited Documents).

Per Ericsson et al. "Towards 17 μm pitch heterogeneously integrated Si/SiGe quantum well bolometer focal plane arrays", Proc. SPIE 8012, Infrared Technology and Application, 2011, 10 pages.

Frank Niklaus "MEMS-Based uncooled Infrared Bolometer Arrays—A Review", Proc. of SPIE, vol. 6836, 2007, 15 pages.

Peng-Fei Wang et al. "FTIR Characterization of Fluorine Doped Silicon Dioxide Thin Films Deposited by Plasma Enhanced Chemical Vapor Deposition", Chinese Physics Letters, vol. 17, No. 12, 2000, 4 pages.

\* cited by examiner

BOLOMETRIC DETECTOR WITH MIM STRUCTURES OF DIFFERENT DIMENSIONS

TECHNICAL FIELD AND PRIOR ART

The invention relates to the field of heat detectors, and more specifically that of uncooled heat detectors such as bolometric detectors, or bolometers or micro-bolometers, of the resistive type. The bolometric detector is advantageously used for carrying out detection of a wide range of wavelengths, notably in the infrared range, for example within the scope of applications such as infrared imaging, night vision, security, monitoring, thermography and biological research, or for achieving gas detection.

In order to achieve detection in the infrared range, an uncooled thermal infrared detector generally includes a sensitive element, the temperature of which increases when the latter receives infrared radiation, for which the wavelength for example belongs to the band III, or long wave infrared (LWIR) (far infrared i.e. wavelengths between about 8 μm and 12 μm, or even between about 7 μm and 14 μm) which is characteristic of the temperature and emissivity of the elements observed with this type of detector. The temperature increase of the sensitive element causes variation of an electric property of the material of this sensitive element: the occurrence of electric charges in the material of the sensitive element by a pyroelectric effect, a variation in the capacity of the material of the sensitive element by a change in its dielectric constant, a variation of the electric resistance of the semi-conducting material or metal material of the sensitive element, etc.

In order to obtain a performing operation of such a thermal infrared detector, the material of the sensitive element should preferably meet three main conditions: it should have a low heat capacity, a good thermal insulation of the active layer (which includes the sensitive element) with respect to its support (both of these first conditions imply that the sensitive element is made as a thin layer) and finally a strong sensitivity of the conversion effect of the heating of the material into an electric signal.

Monolithic infrared images operating at room temperature are for example made by directly connecting an array of sensitive elements to a silicon multiplexing circuit of the CMOS or CCD type.

In order to gain in performance, the thermal infrared detector may be encapsulated under vacuum or in an atmosphere comprising a gas which is not very heat conductive. The casing in which the thermal infrared detector is encapsulated includes a transparent window towards the infrared radiation intended to be detected by the thermal infrared detector.

In a bolometric detector of the resistive type, the incident infrared radiation is absorbed by the sensitive element of the detector, which causes an increase in its temperature and induces a variation of the electric resistance of the sensitive element. This variation of resistance generates a variation of voltage or current on the terminals of the detector, forming the signal delivered by the detector.

Figure 1:
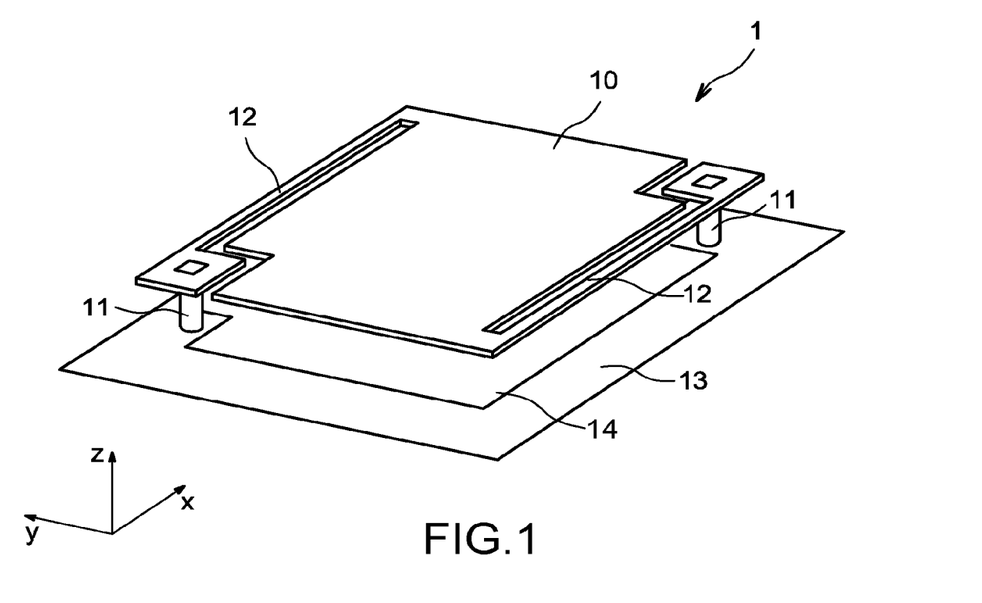
FIGS. 1 to 3 schematically illustrate an infrared heat detector according to the prior art.
Figure 2:
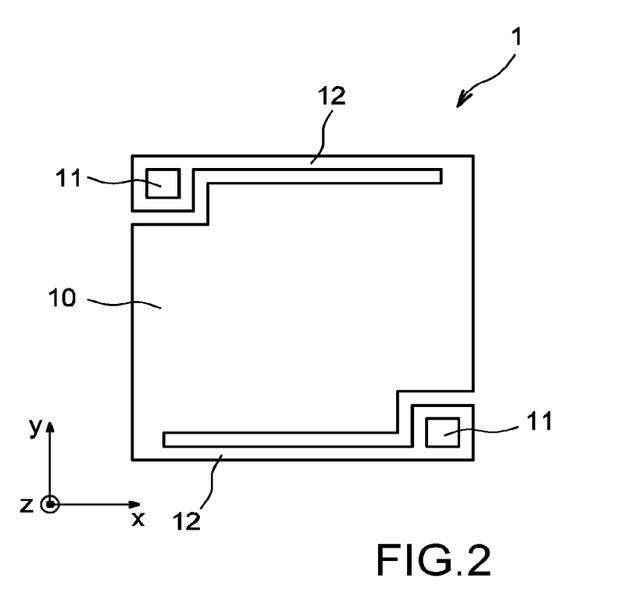
Figure 3:
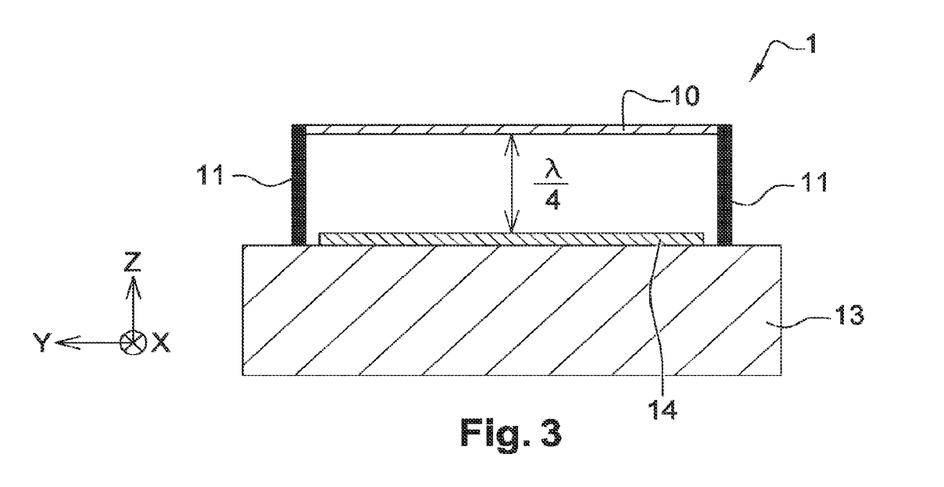

FIGS. 1 to 3 respectively illustrate a perspective view, a top view and a profile view of a bolometric detector 1. This type of detector 1 includes a thin membrane 10 suspended above a supporting substrate 13. This membrane 10 forms the absorbing element and the thermometric element of the detector. Other detectors, similar to the one illustrated in FIGS. 1 to 3, are generally present on the supporting substrate 13. The membrane 10 is mechanically suspended above the substrate 13 via supporting elements 11 to which are attached thermal insulation arms 12 which are mechanically connected to the membrane 10.

Under the effect of the incident radiation received by the detector 1, the membrane 10 heats up and its electric resistance varies accordingly. The supporting substrate 13 includes an electronic circuit integrated on a silicon wafer, this circuit comprising stimulation and read out devices for the thermometric element of each of the detectors 1, on the one hand, and multiplexing components which give the possibility of putting the signals from the different thermometric elements in series towards a reduced number of outlets so that these signals may be utilized by a usual imaging system. The sensitivity of the heat detectors is greatly improved by the presence of thermal insulation arms 12 in the thermal connection between the supporting substrate 13 and the membrane 10, these arms allowing limitation of the thermal losses of the membrane 10 and therefore retaining its heating. The electric inter-connection between the thermometric element of the detector 1 and the read out elements of the electronic circuit is ensured by an electrically conducting layer, generally a metal layer, which is positioned on the thermal insulation arms 12, and by supporting elements 11 which are electrically conductive.

Different materials having a good TCR (relative variation of resistance with temperature, or "Temperature Coefficient of Resistance") and low 1/f noise are advantageously used for producing the membrane 10, such as for example vanadium oxide ($VO_x$), amorphous silicon (a-Si) or $Ge_xSi_{1-x}O_y$.

The detector 1 also includes on the substrate 13, a metal reflector 14 positioned facing the membrane 10 such that this reflector 14 and the membrane 10 form together a resonant optical cavity of the Fabry-Perot type. The distance between the membrane 10 and the reflector 14 is selected so that it is equal to $\lambda/4$, with $\lambda$ corresponding to the wavelength intended to be received by the detector 1 and for which maximum absorption is sought, in order to have strong absorption for this wavelength. This distance varies according to the wavelength intended to be absorbed, and is for example comprised between about 2 and 3 μm for the range of wavelengths from 8-12 μm.

Figure 4:
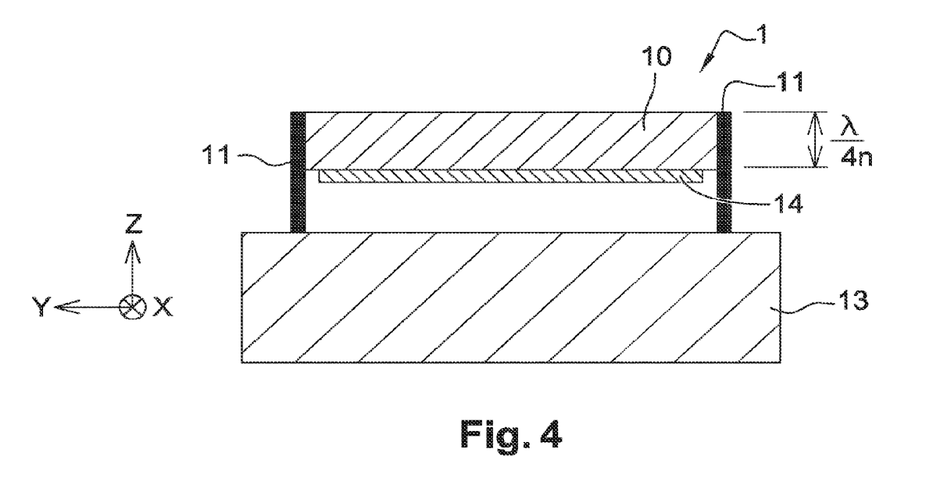
FIG. 4 schematically illustrates an alternative embodiment of an infrared heat detector according to the prior art.

Alternatively, the detector 1 may be produced as illustrated in a profile view in FIG. 4. In this alternative, the resonant cavity is formed by the membrane itself which is made such that its thickness is equal to $\lambda/(4n)$, with n corresponding to the refractive index of the membrane 10. The reflector 14 is further positioned no longer on the substrate 13, but against the lower face of the membrane 10. The thickness of the membrane 10, for example made with amorphous silicon, varies between about 550 nm and 830 nm for the range of wavelengths of 8-12 μm.

The performances of a bolometric detector are characterized by different figures of merit: the noise equivalent temperature difference (NETD), the responsivity (R), the noise equivalent power (NEP) and the detectivity (D). The NETD is defined as being the temperature difference at the source which generates an output signal equal to the noise. The NETD is one the most important parameters for an infrared detector, its value depending on several physical characteristics of the detector: the surface of the detector, the filling factor of the membrane (resistive material) and the TCR of the membrane. In order to obtain a detector having significant sensitivity, a low NETD is desirable, which requires a significant TCR, a large surface and a significant filling factor of the resistive material.

It is interesting to have bolometric detectors of small dimensions but which retain good performances. The simple reduction in the dimensions of a detector however causes a reduction of its optically active area, and therefore also a reduction in the radiation collected by the latter. Further, the surface reserved for the resistive material is also reduced, which degrades the performances of the detector.

The use of an MIM (Metal-Insulator-Metal, i.e. a dielectric portion positioned between two metal layers) in a bolometric detector has the advantage of giving the detector a larger efficient absorption surface area, the detector absorbing the radiation received on a larger surface area than its actual surface area. Such an MIM structure thus gives the possibility of sensing radiations which reach on the edges of the membrane of the detector (for example on the thermal insulation arms or the supporting elements of the membrane) and which, without any MIM structure would be lost. Such a bolometric detector is for example described in document WO 2013/010933A1.

On the other hand, a bolometric detector including an MIM structure is wavelength-sensitive. For example, with an MIM structure with a square section (in the plane of the membrane of the detector) of width $S=\lambda/(2n)$, a first order resonance is obtained at the wavelength $\lambda$ for which the absorption yield is maximum, n corresponding to the effective refractive index of the MIM structure and for which the value is close to the average refractive index of the elements located between the metal layers of the MIM structure.

Such MIM structures are therefore advantageous for making a wavelength-selective bolometric detector, but not for making a bolometric detector without any spectral selectivity or with low spectral selectivity.

DISCUSSION OF THE INVENTION

Thus there is a need to propose a bolometric detector having a large absorption effective surface area, i.e. which may be made with small dimensions without degrading its performances, while not having or not much spectral selectivity in the LWIR range.

For this, one embodiment proposes a bolometric detector able to detect wavelengths in the LWIR range, including at least:
a substrate;
a membrane suspended above the substrate with supporting elements;
an absorbing element comprising several MIM structures, each formed with a lower metal element, an upper metal element specific to each of the MIM structures and with a dielectric element positioned between the lower metal element and the upper metal element;
a thermometric element comprising at least one thermometric material;
wherein:
the membrane includes at least the upper metal element, the thermometric material and at least one portion of the dielectric element of each of the MIM structures,
the upper metal elements of at least two of the MIM structures have different dimensions relatively to each other in a main plane of the membrane, and
the dielectric element of each of the MIM structures includes at least one of the following materials having vibrational modes in the LWIR range: $Al_2O_3$, AlN, $TiO_2$.

It is also disclosed a bolometric detector including at least:
a substrate;
a membrane suspended above the substrate with supporting elements;
an absorbing element comprising several MIM structures, each formed with a lower metal element, an upper metal element specific to each of the MIM structures and with a dielectric element positioned between the lower metal element and the upper metal element;
a thermometric element comprising at least one thermometric material;
wherein the membrane includes at least the upper metal element, the thermometric material and at least one portion of the dielectric element of each of the MIM structures, and wherein the upper metal elements of at least two of the MIM structures have different dimensions relatively to each other in a main plane of the membrane.

The bolometric detector includes several MIM structures of different dimensions. The MIM structures of the detector therefore have specific resonance wavelengths which are different from each other, which has the effect of widening the overall absorption spectrum of the bolometric detector as compared with a similar bolometric detector but which would not have any MIM structure or which would include a single MIM structure or several MIM structures of the same dimensions. This detector is different than a multispectral detector which have an absorption spectra comprising several absorption peaks, whereas the absorption spectra of this detector does not comprise, or only a few, spectral selectivity.

Because of the large effective absorption surface area obtained by means of the MIM structures, the bolometric detector may be made with reduced dimensions as compared with a bolometric detector not including any MIM structure.

Further, because of the two-dimensional structure of the upper metal elements of the MIM structures (the upper metal elements being structured in the main plane of the membrane), the absorption achieved by the bolometric detector does not depend on the polarization state of the incident radiation received by the bolometric detector when the complete structure, i.e. all the MIM structures, has symmetry in the case of a quarter turn rotation (90°). In the absence of such a symmetry, the absorption produced by the bolometric detector has low sensitivity to polarization for example if each structure MIM includes a square or circular section.

The expression <<MIM structure>> designates here a stack including at least one dielectric element positioned between an upper metal element and a lower metal element, and able to achieve absorption of a range of wavelengths according to its dimensions and to the materials of the structure.

The expression <<lower metal element>> designates the metal element of each of the MIM structures which is positioned between the substrate and upper metal element of each of the MIM structures.

The expression <<main plane of the membrane>> designates a plane parallel to the two largest surfaces of the membrane, or parallel to the main faces of the different material layers which are in contact with each other within the membrane. This main plane of the membrane may also be parallel to a face of the substrate facing the membrane.

The LWIR range here corresponds to wavelengths between about 8 μm and 12 μm, or even between 7 μm and 14 μm.

The upper metal elements of the MIM structures may advantageously have a similar shape (for example square, rectangular, disc-shaped, polygonal, etc.).

The dielectric element of each of the MIM structures may include at least one material having vibrational modes (i.e. modes which correspond to atom vibrations in the molecules of one or several of the materials of the dielectric element) in the LWIR range intended to be detected by the bolometric detector. This vibrational resonance in one or several of the materials of the dielectric element is expressed by a significant and localized increase in wavelength of the imaginary part k of the refractive index (permittivity), with k being of the order of or greater than 1, at the wavelength of the vibrational mode. This increase in k is accompanied by a lowering of the real part n of this index, n and k being related to each other through Kramers-Kronig relationships. The wavelength of the vibrational resonance may be considered as being the one which corresponds to the minimum of the n value. In the presence of such a material, an absorption peak associated with the intrinsic absorption of the material is added, in the spectral response of the MIM structures, to the specific resonance (absorption peak) of MIM structures, thereby widening the absorption spectrum of the detector. The vibrational resonance wavelength of this material and the specific resonance wavelength of the MIM structure are both comprised in the spectral range of interest of the detector.

The wavelength of the vibrational resonance of the dielectric material is advantageously different than the resonance wavelength of the MIM structures. However, the enlargement of the absorption spectra is obtained even if this wavelength of vibrational resonance of the dielectric material is equal to the resonance wavelength of the MIM structures.

In this case, the dielectric element may include at least one of the following materials: $SiO_2$, SiN, SiO, $Al_2O_3$, AlN, $TiO_2$.

The dielectric element comprises at least one of the following materials: $Al_2O_3$, AlN, $TiO_2$.

The MIM structures may be regularly spaced out from each other and positioned so as to form an array of MIM structures.

In this case, the bolometric detector may include four MIM structures positioned by forming a 2×2 array, and wherein:
  the four MIM structures may include, in the main plane of the membrane, dimensions which are pair wise similar, or
  each of the four MIM structures may include, in the main plane of the membrane, different dimensions as compared with those of the other MIM structures, or
  two first ones of the four MIM structures may include, in the main plane of the membrane, dimensions similar to each other, and two second ones of the four MIM structures may include different dimensions relatively to each other and different from those of the two first ones of the four MIM structures.

The dimensions of the MIM structures in the main plane of the membrane may be comprised between about 1,000 nm and 2,000 nm, for example when the bolometric detector is intended to achieve detection in the LWIR range, or between about 300 nm and 700 nm for example when the bolometric detector is intended to achieve detection in the MWIR range, and/or the MIM structures may be positioned beside each other with a pitch typically comprised between about 2,000 nm and 3,000 nm, for example when the bolometric detector is intended to achieve detection in the LWIR range, or between about 700 nm and 1,000 nm, for example when the bolometric detector is intended to achieve detection in the MWIR range.

The thermometric material may be part of the dielectric element of each of the MIM structures, or the thermometric material may be positioned above the MIM structures. By using the thermometric material for forming a portion of the dielectric elements of the MIM structures, the bolometric detector has a good thermal time constant which is compatible with a use of the bolometric detector within an imager. Further, the structure of such a bolometric detector does not limit the selection of the usable materials for forming the absorber element of the detector, which is not a penalty to the performances of the bolometric detector because of low frequency noise which remains weak.

When the thermometric material is part of the dielectric element of each of the MIM structures, the membrane may further include, in each of the MIM structures, a first dielectric layer electrically insulating the upper metal element with respect to the thermometric material, and a second dielectric layer electrically insulating the lower metal element with respect to the thermometric material, the first and second dielectric layers may be part of the electric element of each of the MIM structures.

The first and second dielectric layers may be common to all the MIM structures and the thermometric material may be formed with a layer common to all the MIM structures.

According to a first embodiment, the membrane may include the lower metal element of each of the MIM structures. In this configuration, the structures MIM are totally formed by the membrane of the bolometric detector.

According to a second embodiment, the lower metal element of each of the MIM structures may be positioned on the substrate such that an empty space which may be part of the dielectric element of each of the MIM structures is positioned between the membrane and the lower metal element of each of the MIM structures. In this configuration, the membrane only forms a portion of the MIM structures of the bolometric detector.

The lower metal elements may be formed with at least one metal layer common to all the MIM structures or the lower metal elements may be distinct for each of the MIM structures.

The thermometric material may be electrically connected to an electronic circuit of the substrate through at least one electrically conductive layer of the membrane and through the supporting elements.

The membrane may be mechanically and electrically connected to the supporting elements through thermal insulation arms. These thermal insulation arms may be formed by materials present in the membrane.

In each of the MIM structures, a distance between the lower metal element and the upper metal element may be less than or equal to about $\lambda/(4n)$, or advantageously equal to about $\lambda/(10n)$, with $\lambda$ corresponding to a wavelength for which the absorption yield of the bolometric detector is maximum and n corresponding to the effective refractive index of the MIM structure. Further, a $\lambda/2$ reflective cavity under the MIM structures is not desired.

Another embodiment concerns a thermal detection device including several bolometric detectors as described above, said bolometric detectors may be positioned by forming an array of pixels such that each bolometric detector forms a single pixel of the array.

The bolometric detectors may be laid out by forming several sub-arrays, the bolometric detectors of each of said sub-arrays may be able to achieve detection of a range of wavelengths different from those intended to be detected by the bolometric detectors of the sub-array or of the other sub-arrays.

The array may include at least one baselining bolometric detector including a membrane suspended above the substrate and thermally connected to the substrate.

The array may include at least one reference bolometric detector not including any MIM structure.

SHORT DESCRIPTION OF THE DRAWINGS

The present invention will be better understood upon reading the description of exemplary embodiments given purely as an indication and by no means as a limitation with reference to the appended drawings wherein.

Identical, similar or equivalent portions of the different figures described hereafter bear the same numerical references so as to facilitate passing from one figure to the other.

The different portions illustrated in the figures are not necessarily illustrated according to a uniform scale, in order to make the figures more legible.

The different possibilities (alternatives and embodiments) should be understood as not being exclusive of each other and may be combined together.

DETAILED DISCUSSION OF PARTICULAR EMBODIMENTS

Figure 5:
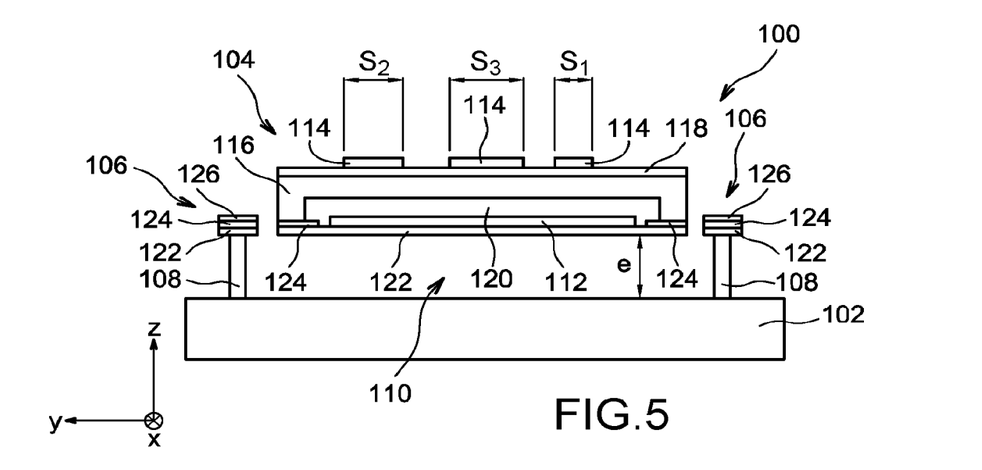
FIGS. 5 and 6 schematically illustrate a bolometric detector according to a first embodiment.

First of all reference will be made to FIGS. 5 and 6 which respectively illustrate a sectional profile view and a top view of a bolometric detector 100, or infrared heat detector, according to a first embodiment. The sectional profile view illustrated in FIG. 5 is made along an axis AA' illustrated in FIG. 6. The bolometric detector 100 corresponds to a bolometer or micro-bolometer intended to achieve detection in the infrared range, notably in band III, i.e. a detection of wavelengths comprised between about 8 µm and 12 µm, or between about 7 µm and 14 µm.

The bolometric detector 100 includes a substrate 102, for example a wafer, or platelet, of silicon, forming a mechanical support of the bolometric detector 100. The substrate 102 notably includes an integrated electronic circuit (not visible in FIGS. 5 and 6) allowing electrically powering the bolometric detector 100 and also reading the signals delivered by the bolometric detector 100. This electronic circuit may also include a multiplexing circuit giving the possibility of processing signals delivered by several bolometric detectors 100, similar to the one illustrated in FIGS. 5 and 6, made above the substrate 102. Each bolometric detector 100 corresponds to a pixel of a detection array formed above the substrate 102 and which is electrically connected to the electronic circuit.

The bolometric detector 100 includes a membrane 104 suspended above, or facing the substrate 102 via thermal insulation arms 106 to which the membrane 104 is mechanically connected and via supporting elements 108, forming anchoring pads, or nails, ensuring mechanical hold of the membrane 104 and of the thermal insulation arms 106 above the substrate 102. An empty space 110, forming a cavity with the thickness of e (this thickness corresponding to the dimension between the membrane 104 and the substrate 102) is present between the substrate 102 and the membrane 104, as well as between the substrate 102 and the thermal insulation arms 106. The thermal insulation between the membrane 104 and the substrate 102 is ensured by the thermal insulation arms 106 as well as by the empty space 110. This distance between the substrate 102 and the membrane 104 is independent of the wavelengths of the radiation received by the detector 100 and intended to be detected, and the value of the thickness e may be as small as possible from the moment that the thermal insulation is maintained between the substrate 102 and the membrane 104.

The membrane 104 includes elements forming both the absorbing element and the thermometric element of the bolometric detector 100. The absorbing element is formed with several MIM structures made beside each other, advantageously as a two-dimensional array with N MIM structures. In the example of FIGS. 5 and 6, the membrane 104 includes 9 MIM structures positioned as a 3×3 array, alternatively, it is possible that the MIM structures be positioned by forming at least one portion of an array including a different number of line and/or column, or further that the MIM structures are positioned beside each other according to a pattern different from that of an array. Generally, the membrane 104 includes a number N of MIM structures greater than or equal to 2.

Each of the MIM structures includes a lower metal element 112, made as a portion of a metal layer which, in the first embodiment, is common to all the MIM structures of the membrane 104 (i.e. made as a continuous layer), which gives the possibility of maximizing the absorption achieved by the MIM structures of the bolometric detector 100. The metal layer forming the lower metal elements 112 here has a uniform thickness and similar for all the MIM structures.

Each of the MIM structures also includes an upper metal element 114. Each upper metal element 114 for example here has a section, in a plane parallel to one face of the substrate 102 facing the membrane 104 (parallel to the planes (X,Y) in FIGS. 5 and 6), or further in the main plane of the membrane 104, of a square shape. Alternatively, the shape of the upper metal elements 114 may be different, for example round, rectangular, triangular, hexagonal, cruciform, polygonal shape, etc. The metal elements 112 and 114 comprise advantageously one or several metals such as aluminum, titanium, tungsten, gold, silver, etc.

The fact that the bolometric detector 100, which correspond to a single pixel of a detection array formed with several bolometric detectors, includes several MIM structures, allows more light to be captured, i.e. improving the absorption yield of the bolometric detector 100, because of the larger amount of incident light which is filtered/absorbed by means of the MIM structures will each have a large efficient absorption surface area.

The thicknesses of the lower metal elements 112 and of the upper metal elements 114 are small in order not to increase the heat capacity of the membrane 104, and further are greater than about twice the skin thickness of the materials used. The thickness (dimension along the axis Z) of the upper metal elements 114 is for example greater than about 30 nm, and for example comprised between about 30 nm and 100 nm, and that of the lower metal elements 112 is for example greater than or equal to about 50 nm. Further, the metal elements 112 and 114 may include a sheet resistance of less than or equal to about 1 Ohm/square.

The MIM structures also include, between the lower metal elements 112 and the upper metal elements 114, dielectric elements allowing the MIM structures to excite plasmon resonances over the whole of the range of the wavelengths intended to be detected by the bolometric detector 100. These plasmon resonances laterally occur (in the plane (X,Y)) in the dielectric elements of the MIM structures, facing the upper metal elements 114.

These dielectric elements comprise a thermometric material layer 116 therefore being used both as a thermometric element of the bolometric detector 100 and as a dielectric element, or insulator, of the MIM structures which form together the absorbing element of the bolometric detector 100. The thickness (dimension along the Z axis) of the thermometric material layer 116 is less than or equal to about one quarter of the smallest absorbed wavelength, and for example comprised between about 150 nm and 250 nm. The thermometric material layer 116 here has a uniform thickness and similar for all the MIM structures, this layer being continuous and common to all the MIM structures.

The dielectric elements of the MIM structures also include a first dielectric layer 118, here common to all the MIM structures and which also ensures the role of an electric insulator and of a diffusion barrier between the upper metal elements 114 and the thermometric material layer 116, and therefore between the thermometric element and the absorbing element of the bolometric detector 100, as well as a second dielectric layer 120 which further ensures the role of an electric insulator and of a diffusion barrier between the layer forming the lower metal elements 112 and the thermometric material layer 116. The first and second dielectric layers 118 and 120 each correspond to a dielectric layer or a stack of several very thin dielectric layers, for which the thickness is for example comprised between about 5 nm and 20 nm, and for example including SiN, SiO, $SiO_2$, $Al_2O_3$, AlN or $TiO_2$, these materials being selected so that they have vibrational modes in the range of the wavelengths of interest of the detector 100 while ensuring electric insulation between the thermometric material layer 116 and the metal elements 112 and 114. In the LWIR range, the dielectric material comprises $Al_2O_3$, AlN, or $TiO_2$. The material(s) and thickness(es) of these dielectric layers 118, 120 is (are) also selected so that these layers are transparent and not very absorbent towards the wavelengths intended to be detected by the bolometric detector 100. The dielectric layers 118 and 120 here each have a uniform thickness and similar for all the MIM structures, these layers being continuous and common to all the MIM structures.

Further, within a single bolometric detector 100, the upper metal elements 114 have, in the plane of the membrane 104 (i.e. a plane parallel to the main faces of the different layers positioned against each other for forming the membrane 104, here parallel to the plane (X,Y)) dimensions (side, diameter, etc.) which are not all similar. Thus, from among the N (N≥2) upper metal elements 114 of the bolometric detector 100, at least two of these N upper metal elements 114 have different dimensions from each other in the plane of the membrane 104. For example it is possible that within the bolometric detector 100, all the upper metal elements have different dimensions, in the plane of the membrane 104, from each other. It is also possible that a first set of upper metal elements 114 have different dimensions with respect to one or several other sets of upper metal elements 114, the elements 114 of this one or of each of these other sets having similar dimensions to each other, and each of these sets of elements 114 being formed with at least one element 114. In the example illustrated in FIGS. 5 and 6, the three first elements 114 each have sides with a dimension $S_1$, three second elements 114 each include sides of dimension $S_2$, and three third elements 114 each have sides of dimension $S_3$, with $S_1<S_2<S_3$. The dimensions, in the plane of the membrane 104, of each of the elements 114 are for example comprised between about 1,000 nm and 2,000 nm for operation in the LWIR range, or comprised between about 300 nm and 700 nm for operation in the MWIR range. The pitch, or the period, with which the elements 114 are made, is for example comprised between about 2,000 nm and 3,000 nm for operation in the LWIR range, or comprised between about 700 nm and 1,000 nm for operation in the MWIR range.

Thus, because the values of the wavelengths which are detected by the detector 100 notably depend on the dimensions, in the plane (X,Y), of the upper metal elements 114 of the MIM structures (dimensions equal to about $\lambda/(2n)$ or an odd multiple of $\lambda/(2n)$, with $\lambda$ corresponding to the wavelength for which the absorption yield is maximum, and n corresponding to the effective refractive index of the MIM structure and for which the value is close to the average refractive index of the layers comprised between the metal elements of the MIM structure), the absorption spectrum of the bolometric detector 100 corresponds to the superposition of various spectra of MIM structures of different dimensions, which may thus cover a wide range of wavelengths. Further, in order to avoid having diffraction, the upper metal elements 114 are made beside each other with a pitch of less than the wavelength for which the absorption yield is maximum.

In each of the MIM structures, the total thickness of the elements positioned between the upper metal element 114 and the lower metal element 112, i.e. the sum of the thicknesses of the first dielectric layer 118, of the second dielectric layer 120 and of the thermometric material 116, and which corresponds to the distance between the metal elements 112 and 114, is less than or equal to about $\lambda/(4n)$, with here $\lambda$ corresponding to the smallest absorbed wavelength. Advantageously, this total thickness of the dielectric elements of the MIM structures is less than or equal to about $\lambda/(10n)$.

The detector 100 further includes a third dielectric layer 122 which is common to the membrane 104 and to the thermal insulation arms 106, and on which is positioned an electrically conductive layer 124 which is also common to the membrane 104 and to the thermal insulation arms 106. The electrically conductive layer 124, which for example comprises Ti, TiN or Pt, for example has a thickness comprised between about 5 nm and 100 nm and has a sheet resistance comprised between about 100 and 1,000 Ohm per square. The third dielectric layer 122 comprises for example $SiO_2$ or SiON, and includes a thickness for example between about 5 nm and 50 nm. Finally, dielectric portions 126 cover portions of the electrically conductive layer 124 located in the thermal insulation arms 106. The material and the thickness of the dielectric portions 126 are for example similar to those of the third dielectric layer 122.

In the membrane 104, portions of the electrically conductive layer 124 are electrically in contact with the thermometric material layer 116, thereby giving the possibility of ensuring the electric power supply of the membrane 104 and the read out of the produced detection signals. Further, in the thermal insulation arms 106, portions of the electrically conductive layer 124 are electrically in contact with the supporting elements 108. Thus, because the supporting elements 108 comprise an electrically conductive material, such as for example Al, Cu or WSi, and are electrically connected to the input stage of the electronic circuit integrated to the substrate 102, and because the portions of the electrically conductive layer 124 of the membrane 104 and of the thermal insulation arms 106 form a continuous electric connection, the thermometric material layer 116 is electrically connected to the electronic circuit integrated to the substrate 102 via the supporting elements 108 and the electrically conductive layer 124.

The materials and the thicknesses of the elements forming the membrane 104 are also selected such that the membrane 104 has good mechanical strength above the substrate 102 in order to avoid flexure of the membrane 104.

In the bolometric detector 100, the thermometric material 116 is advantageously used both as a thermometric element of the bolometric detector 100 and as a dielectric element of the absorbing element of the bolometric detector 100, within the MIM structures of the bolometric detector 100. In order that the thermometric material 116 may fulfill both of these functions, the latter is advantageously selected from materials for which the electric resistivity is greater than or equal to about 0.1 Ohm·cm. Thus, the thermometric material 116 for example includes amorphous silicon, germanium, SiGe, ZnS, etc. These examples of materials all have sufficient resistivity so as to not alter the optical operation of the MIM structure and a TCR for example comprised between about 1% and 5%, unlike a thermometric material corresponding to Ti, Pt or lanthanum manganite which have too low resistivity, of less than about 0.1 Ohm·cm. Further, the examples of materials mentioned previously for the thermometric material 116 are transparent or slightly absorbent with respect to the wavelengths intended to be detected by the bolometric detector 100, and having a strong temperature coefficient and weak low frequency noise.

In this first embodiment, the thickness, or height, e of the empty space 110 is not involved in the absorption yield of the bolometric detector 100. Thus, this thickness e may be of any value, but at least such that the membrane 104 and the substrate 102 are spaced apart from each other by a sufficient distance in order to avoid contact with each other because of the mechanical and electrostatic stresses which may be experienced by the membrane 104. This thickness e may also be adjusted so as to limit the parasitic absorption from the thermal insulation arms 106 and from the contact regions formed by the portions of the electrically conductive layer 124 in contact with the thermometric material 116. This thickness e is for example comprised between about 1 μm and 5 μm.

Figure 7:
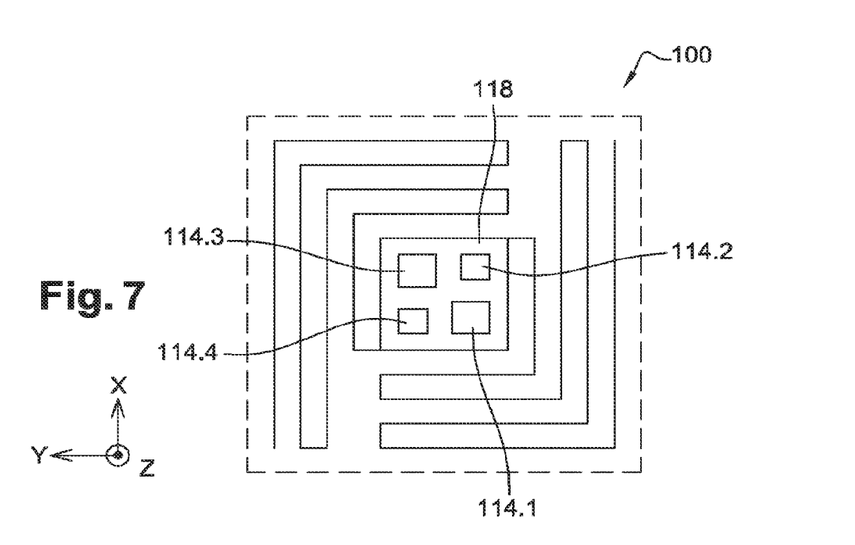
FIG. 7 schematically illustrates the bolometric detector according to an alternative of the first embodiment.

FIG. 7 illustrates a top view of the bolometric detector 100 for example according to an alternative of the first embodiment described earlier.

Figure 6:
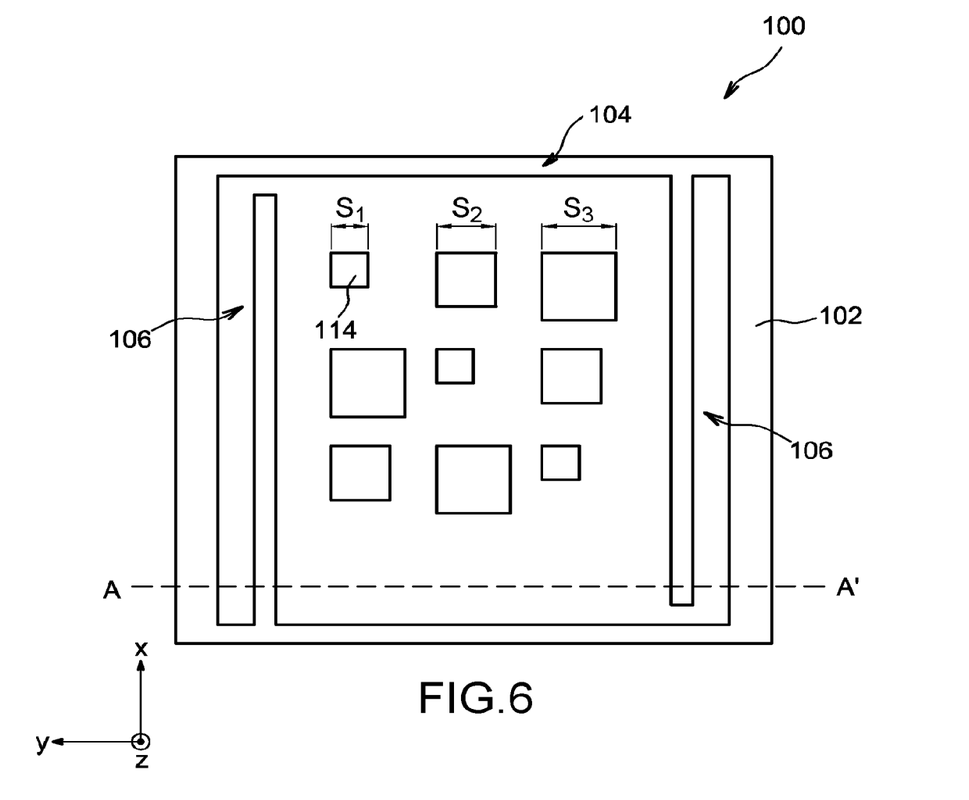

In this alternative, the detector 100 includes four MIM structures each including a lower metal element 112, here formed by a layer common to the four MIM structures like in FIGS. 5 and 6, and one of the upper metal elements 114.1-114.4. The dimensions in the plane of the membrane 104 (plane (X,Y)) of the upper metal elements 114.1-114.4 are not similar. Thus, it is possible that:

- the dimensions, in the plane of the membrane 104, of the upper metal elements 114.1-114.4 are different for all the elements 114.1-114.4 (for example, for elements 114.1-114.4 each having a section, in the plane of the membrane 104, with a square shape and with dimensions S1 (element 114.1), S2 (element 114.2), S3 (element 114.3) or S4 (element 114.4), these dimensions being such that S1≠S2≠S3≠S4), or
- the dimensions, in the plane of the membrane 104, of two of the elements 114.1-114.4 are different from the dimensions of the two other elements 114.1-114.4 (for example S1=S3 and S2=S4, and S1≠S2, as this is the case in the example illustrated in FIG. 7), or
- the dimensions in the plane of the membrane 104 of one of the elements 114.1-114.4 are different from those of the other elements 114.1-114.4 (for example S1=S2=S3 and S4≠S1).

Figure 8:
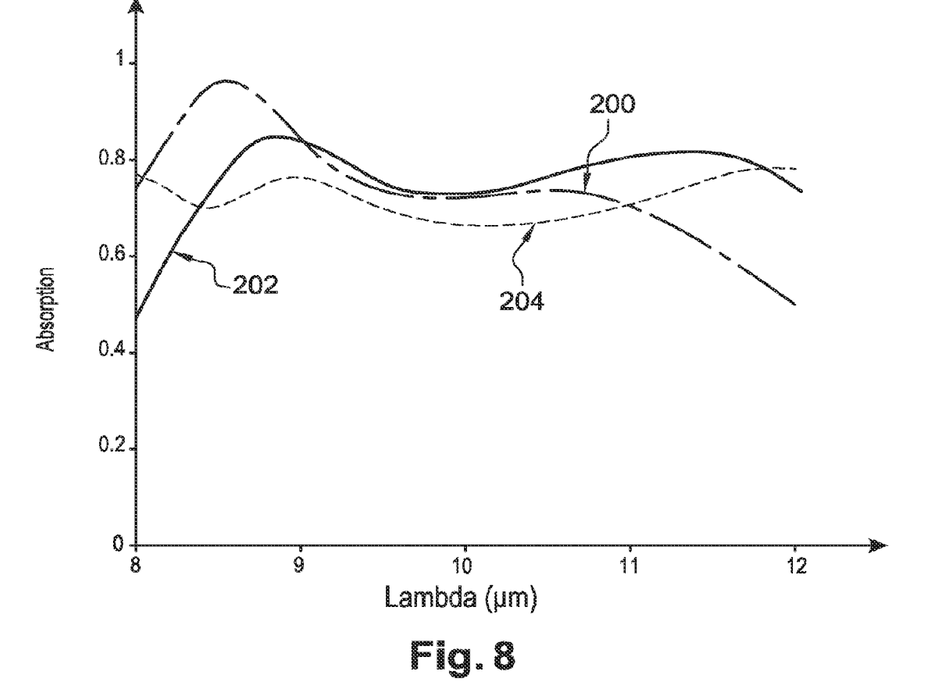
FIGS. 8 and 9 illustrate absorption spectra of a bolometric detector according to the particular configuration of FIG. 7.

The curve 200 illustrated in FIG. 8 corresponds to the absorption spectrum of the detector 100 of FIG. 7 obtained in the range 8-12 μm when S1=S3=1.2 μm and S2=S4=1.125 μm.

The curve 202 illustrated in FIG. 8 corresponds to the absorption spectrum of the detector 100 of FIG. 7 obtained in the range 8-12 μm when S1=1.275 μm, S2=1.125 μm, S3=1.2 μm and S4=1.3125 μm.

The curve 204 illustrated in FIG. 8 corresponds to the absorption spectrum of the detector 100 of FIG. 7 obtained in the range 8-12 μm when S1=1.3875 μm, S2=1.125 μm, S3=1.125 μm and S4=1.3125 μm.

The curves 200, 202 and 204 illustrated in FIG. 8 are obtained with a metal layer forming the lower metal elements 112 with a thickness equal to 100 nm, a thermometric material 116 formed by an amorphous silicon layer with a thickness equal to 150 nm, dielectric layers 118, 120 with a thickness equal to 10 nm, and by producing the elements 114.1-114.4 with a pitch, or a period, equal to 1.5 μm, and a thickness equal to 50 nm.

Figure 9:
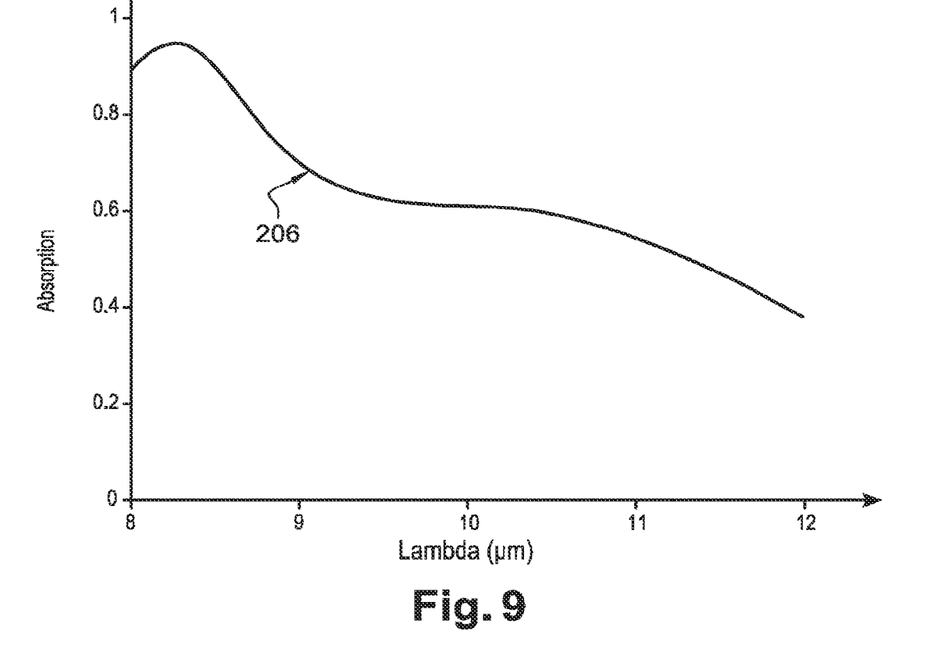

The curve 206 illustrated in FIG. 9 corresponds to the absorption spectrum of the detector 100 of FIG. 7 obtained in the range 8-12 μm when S1=S3=0.7 μm and S2=S4=0.8 μm, when titanium is used for forming the upper metal portions 114.1-114.4.

Figure 10:
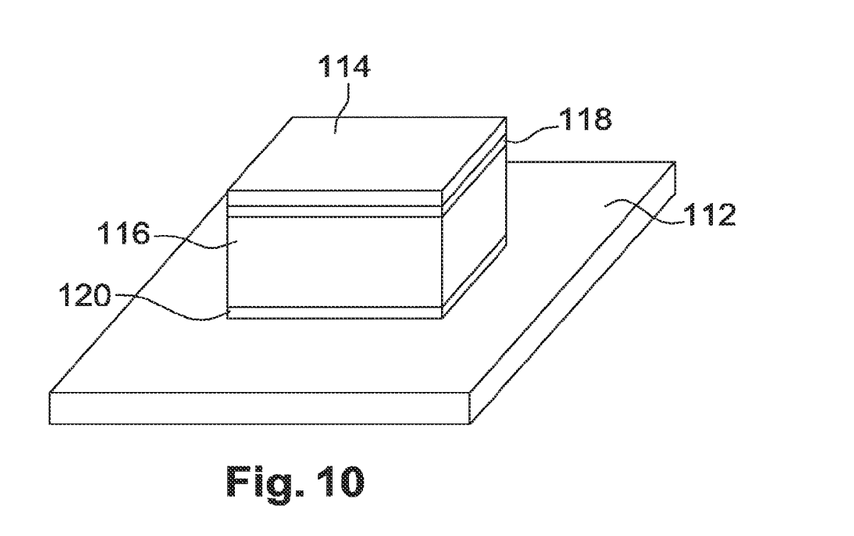
FIG. 10 illustrates an MIM structure of a bolometric detector according to another alternative of the first embodiment.

As an alternative of the first embodiment described above, the first dielectric layer 118 may be structured according to similar patterns to those of the upper metal elements 114. In this case, each of the MIM structures includes upper metal elements 114 positioned on dielectric portions with similar shape and dimensions to those of the upper metal portions 114. It is also possible that this structuration is also extended through the thermometric material layer 116, and optionally through the second dielectric layer 120, this layer or these layers (118+116 or 118+116+120) are in this case also structured according to patterns similar to those of the upper metal elements 114. FIG. 10 schematically illustrates a thereby produced MIM structure, i.e. wherein the first dielectric layer 118, the thermometric material layer 116 and the second dielectric layer 120 are also structured according to a pattern similar to that of the upper metal element 114.

Figure 11:
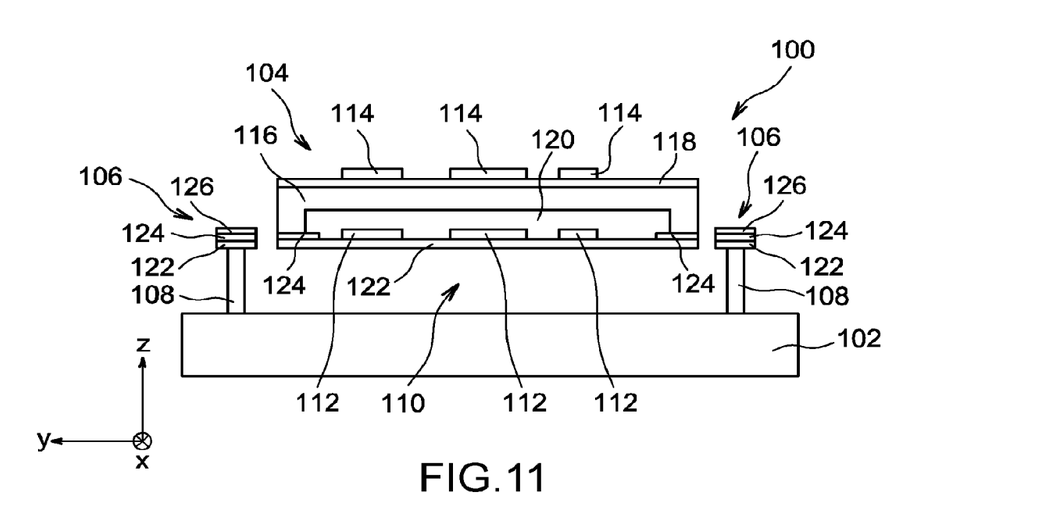
FIG. 11 schematically illustrates a bolometric detector according to a second embodiment.

Reference is now made to FIG. 11 which illustrates a sectional profile view of the bolometric detector 100 according to a second embodiment.

As compared with the first embodiment described earlier, the membrane 104 does not include a single metal layer common to all the MIM structures and forming the lower metal elements 112 of the MIM structures. Here, each of the MIM structures of the absorbing element of the bolometric detector 100 includes a distinct lower metal element 112.

Each of the lower metal elements 112 is positioned facing one of the upper metal elements 114 and includes here dimensions, in the plane (X,Y), substantially similar to those of the upper metal element 114 facing which it is positioned. The spacing between the lower metal elements 112, i.e. the pitch of these elements 112, is also similar to that between the upper metal elements 114. Alternatively, the dimensions and/or the shape and/or the pitch of the lower metal elements 112 may be different from those of the upper metal elements 114. The thicknesses of the lower metal elements 112 are here similar to each other, and for example of a same value as that of the layer forming the lower metal elements 112 of the first embodiment. Further, portions of the second dielectric layer 120 are positioned between the lower metal elements 112 in order to insulate them from each other. The other elements of the bolometric detector 100 according to this second embodiment are similar to those of the bolometric detector 100 according to the first embodiment.

Relatively to a single continuous layer forming the lower metal elements 112 of all the MIM structures of the absorbing element of the bolometric detector 100 like in the first embodiment, the use of several distinct lower metal elements 112 for each of the MIM structures of the bolometric detector 100 according to this second embodiment allows reduction in the heat constant of the bolometric detector 100.

Further, the use of several distinct lower metal elements 112 is not a penalty with respect to the residual absorption obtained in so far that this configuration allows limitation of the regions which may dissipate electromagnetic energy received outside the sought resonance, and gives the possibility of avoiding that electrically conductive areas having a high sheet resistance are exposed to the incident radiation.

The alternatives described earlier for the first embodiment (structuration of at least one of the first dielectric layer 118, of the thermometric material layer 116 and of the second dielectric layer 120) may also be applied to this second embodiment.

Figure 12:
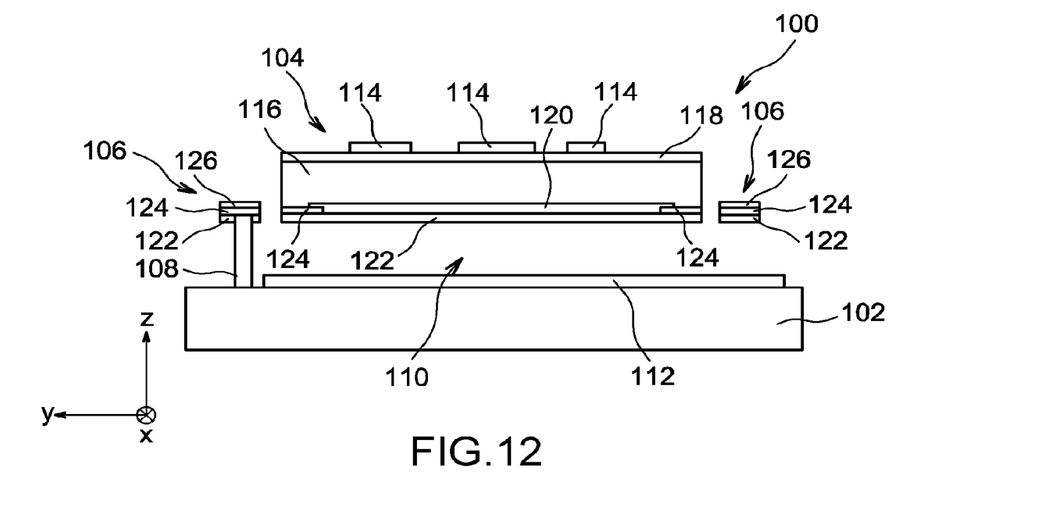
FIG. 12 schematically illustrates a bolometric detector according to a third embodiment.

FIG. 12 illustrates a sectional profile view of the bolometric detector 100 according to a third embodiment.

Like in the first embodiment, a single continuous metal layer and common to all the MIM structures forms the lower metal elements 112 of the MIM structures of the absorbing element of the bolometric detector 100. On the other hand, unlike the first embodiment in which this lower metal layer is positioned in the membrane 104 suspended above the substrate 102, it is here positioned not in the suspended membrane 104, but on the substrate 102 such that the cavity 110 is formed between the lower metal elements 112 and the membrane 104. In this third embodiment, the dielectric elements of the MIM structures are formed by the thermometric material 116, the first dielectric layer 118, the second dielectric layer 120 (which alternatively may be omitted), the third dielectric layer 122 as well as the cavity 110. In this third embodiment, the thickness e of the cavity 110 is taken into account in calculating the thickness of the dielectric of the MIM structures which may be less than or equal to $\lambda/4n$, or advantageously less than or equal to $\lambda/10n$.

In this third embodiment, the thickness of the lower metal layer is selected to be sufficiently thick so as to limit losses by the Joule effect inside it, and for example such that the resistivity of the lower metal elements 112 is less than or equal to about 0.1 Ohm/square.

As compared with the first embodiment, this third embodiment has the advantage of lowering the time constant of the bolometric detector 100. Further, the bolometric detector according to this third embodiment may be made inexpensively since the method applied for making this bolometric detector 100 follows the process of standard steps of methods applied for making bolometers. Further, as compared with the bolometers of the prior art, a single additional photolithographic level may be carried out for forming the upper metal elements 114.

As an alternative of this third embodiment, several distinct lower metal elements 112, each forming the lower metal element of one of the MIM structures, may be positioned on the substrate 102 in the place of a single continuous metal layer. The other alternatives described earlier for the first embodiment may also be applied to the third embodiment.

As an alternative of the embodiments described earlier, it is possible that the thermometric material layer 116 is not positioned within the MIM structures, i.e. between the metal elements 112 and 114, but be positioned above the MIM structures. In this case, the thermometric material layer 116 rests on the MIM structures of the membrane 104.

FIGS. 13A to 13H illustrate the steps of a method for making two bolometric detectors 100 each including several MIM structures of different dimensions.

Figure 13A:
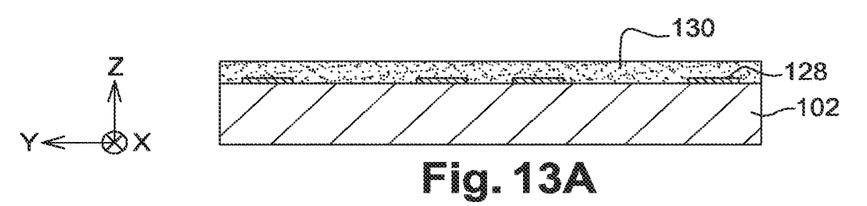
FIGS. 13A to 13H illustrate the steps of a method for making a bolometric detector according to a particular embodiment.

The method is applied from the substrate 102 including the integrated electronic circuit. Electric contact pads 128, to which the supporting elements 108 are intended to be connected, are made on the front face of the substrate 102. A first sacrificial layer 130 is then deposited on the front face of the substrate 102, also covering the pads 128 and for example in polyimide and with a thickness comprised between about 1 μm and 5 μm (FIG. 13A). The thickness (dimension along the Z axis) of this first sacrificial layer 124 corresponds to the thickness e of the cavity 110 which will be formed between the membrane 104 and the substrate 102.

Figure 13B:
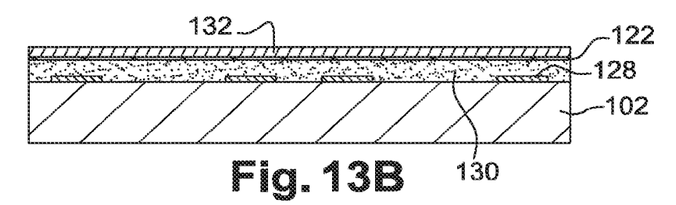

The third dielectric layer 122 is deposited on the first sacrificial layer 130, and a first metal layer 132, for example including aluminum, is deposited on the third dielectric layer 122 (FIG. 13B). The first metal layer 132 is intended to form the lower metal elements 112 of the detectors 100. The material and the thickness of the first metal layer 132 are therefore selected depending on the desired characteristics for the lower metal elements 112.

The third dielectric layer 122 and the first metal layer 132 are then shaped, for example by lithography and etching. The remaining portions of the first metal layer 132 form the lower metal elements 112 of the detectors 100.

A second sacrificial layer 134, for example including a material similar to that of the first sacrificial layer 130, is then deposited and then planarized with stopping on the lower metal elements 112.

Figure 13C:
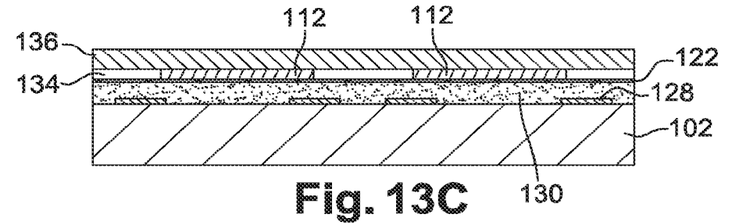

A stack of layers 136, comprising a thermometric material layer positioned between two dielectric layers, is then deposited on the remaining portions of the second sacrificial layer 134 and on the lower metal elements 112 (FIG. 13C). The materials and thicknesses of the layers of the stack 136 are selected depending on the desired materials and thicknesses of the thermometric material layer 116 and of the dielectric layers 118, 120 of the detectors 100.

The stack of layers 136 is then shaped, for example by etching, so that the remaining portions of the stack 136 form the thermometric material layer 116 and the dielectric layers 118, 120 of each MIM structure of the detectors 100.

Figure 13D:
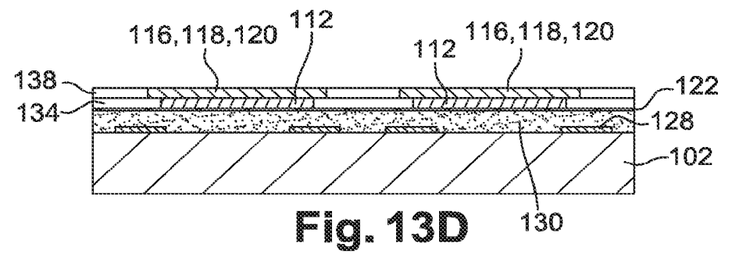

A third sacrificial layer 138, for example including a material similar to that of the first and second sacrificial layers 130 and 134, is then deposited and then planarized with stopping on the remaining portions of the stack 136 (FIG. 13D).

Figure 13E:
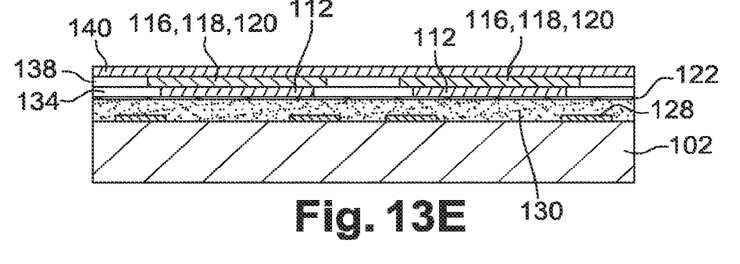

A second metal layer 140, for example including aluminum, is deposited on the remaining portions of the stack 136 and of the third sacrificial layer 138 (FIG. 13E). The second metal layer 140 is intended to form the upper metal elements 114. The material and thickness of the second metal layer 140 are therefore selected depending on the desired characteristics for the upper metal elements 114.

Figure 13F:
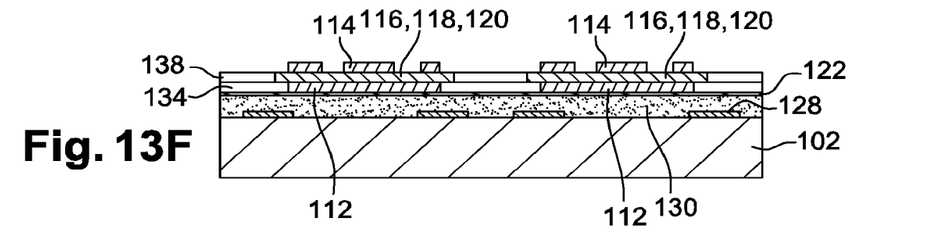

The second metal layer 140 is then shaped, for example by lithography and etching, so that the remaining portions of this layer form the upper metal elements 114 (FIG. 13F).

Figure 13G:
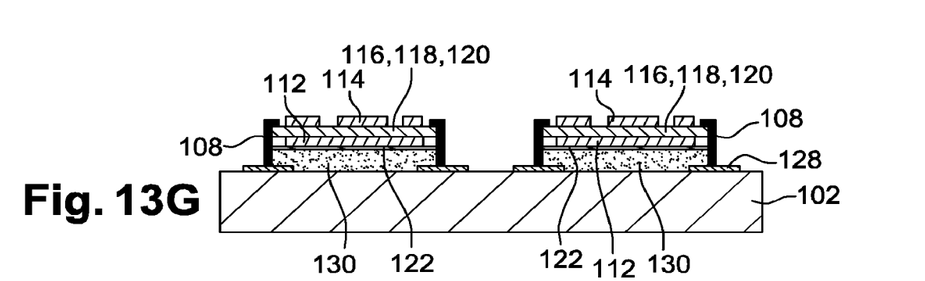

Conductive vias are then produced through the sacrificial material of the layers 130, 134 and 138, forming the supporting elements 108 of the detectors 100. The portions of the sacrificial layers 130, 134 and 138 located between the detectors 100 are suppressed, for example by etching (FIG. 13G).

Figure 13H:
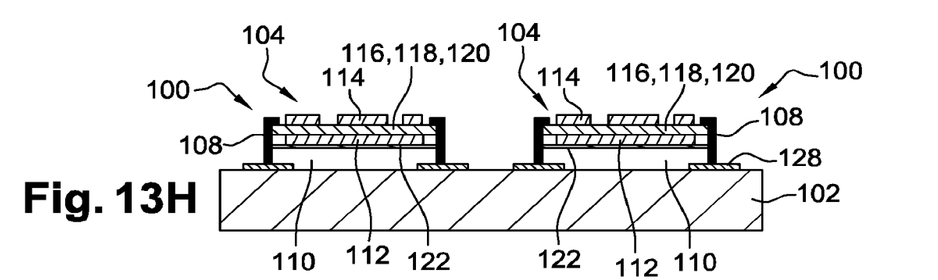

Finally, the making of the detectors 100 is completed by etching the remaining portions of the sacrificial layers 130, 134 and 138 still present, thereby releasing the membranes 104 of the detectors 100 with respect to the substrate 102 (FIG. 13H).

In each detector 100, the membrane 104 is advantageously made in thin layers and the thermal insulation arms 106 of the bolometric detector 100 are finely defined so as to achieve efficient thermal insulation of the membrane 104 with respect to the substrate 102 and to the electronic circuit formed in the substrate 102.

In the case of the third embodiment, the lower metal layer, forming the lower metal elements 112, is made on the substrate 102 prior to the sacrificial layer 130 which is then deposited by covering this lower metal layer.

The thin dielectric layers of the membrane 104, i.e. the first dielectric layer 118, the second dielectric layer 120 and the third dielectric layer 122, are for example made by low temperature depositions such as depositions by cathode sputtering or by plasma decomposition (PECVD). The etching of these layers, applied after their deposition may be achieved by plasma-assisted chemical etching.

The electrically conductive layer 124 is made via deposition, for example cathode sputtering, and the structured by etching, for example chemical etching or etching with a plasma.

The thermometric material 116 is for example deposited at a low temperature, for example by cathode sputtering, thermal decomposition (LPCVD) or with a plasma (PECVD). The optional doping of the thermometric material 116 is achieved by introducing a doping gas (for example $BF_3$ or $PH_3$) into the reactor used for its deposition, or else by ion implantation. The etching of the thermometric material 116 is generally carried out with a plasma-assisted chemical etching method.

Regardless of the embodiment, several bolometric detectors 100 are advantageously made collectively beside each other as an array, each bolometric detector 100 forming a pixel of this detection array.

In each bolometric detector 100, the resistance of the thermometric material varies according to the temperature of the image scene. However, the variations of the temperature of the scene which are intended to be measured are very small. In order to detect more easily these variations, the electronic circuit integrated to the substrate 102 may include a strong gain amplifier or integrator stage in order to amplify the signals delivered by the bolometric detectors 100. In order to increase the readout sensitivity of the bolometric detectors 100, it is possible to derive the invariant fraction of the measured current, corresponding to the background temperature of the image scene, in a so called "baselining" branch of the detectors, in order to only send the variable portion of the current, corresponding to the variations of temperatures intended to be measured, towards the amplifier or integrator stage of the electronic circuit in order to avoid saturating it. For this a solution may consist of using as a baselining resistance of so called baselining bolometers, made from the same materials as those used for making bolometric detectors 100, optionally thermalized at the temperature of the focal plane and which do not achieve detection of the temperature of the scene because these baselining bolometers do not include any thermal insulation arm and therefore include their membrane thermally connected to the substrate through the supporting elements.

Further, it is possible that an array of bolometric detectors 100 be formed with several sub-arrays each including one or several bolometric detectors 100 as described earlier, each sub-array being able to achieve detection of a range of wavelengths different from those able to be detected by the other sub-arrays, thereby forming a multi-spectral detection array.

Figure 14:
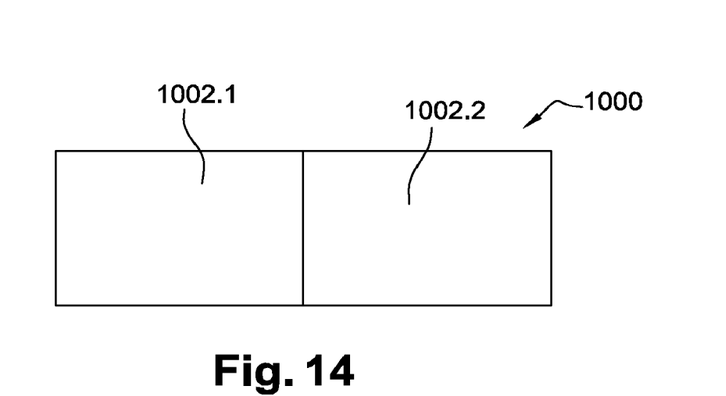
FIG. 14 schematically illustrates a portion of a multispectral heat detection device according to a particular embodiment.

FIG. 14 schematically illustrates a portion of a detection device 1000 including a multi-spectral detection array.

This multi-spectral detection array includes two sub-arrays 1002.1 and 1002.2 each including one or several bolometric detectors 100 as defined earlier. Each of the sub-arrays is able to achieve detection of a range of wavelengths defined by parameters (dimensions, shape, pitch) of the MIM structures of the bolometric detectors of each sub-array. In the example of FIG. 14, the detectors 100 of the first sub-array 1002.1 are able to achieve detection in the LWIR range, and those of the second sub-array 1002.2 are able to achieve detection in the MWIR range. The detection device 1000 may include a larger number of sub-arrays according to the spectral ranges intended to be detected.

The detector(s) of one of the sub-arrays (for example a third sub-array) may be used as a reference for the bolometric detectors of the other sub-arrays. This (these) detector(s) used as a reference are not sensitive to the radiation received by the detection device, for example by making this (these) detector(s) such that they do not include any MIM structure like the bolometric detectors of the other sub-arrays. Thus, by subtracting the value(s) of these signal(s) delivered by the detector(s) of this reference sub-array from the values of the signals delivered by the bolometric detectors of the other sub-arrays, it is possible to suppress the common mode present in the signals delivered by the detectors of the other sub-arrays.

Further, one or several of the sub-arrays may include so called baselining bolometers as described earlier.

Regardless of the embodiment, the dimensions of the bolometric detectors 100 depend on the size of the pixel intended to be formed with the bolometric detectors 100.

The invention claimed is:
1. A bolometric detector able to detect wavelengths in the long wavelength infrared (LWIR) range, including at least:
   a substrate;
   a membrane suspended above the substrate by supporting elements;
   an absorbing element comprising several MIM structures each formed with a lower metal element, an upper metal element specific to each of the MIM structures and with a dielectric element positioned between the lower metal element and the upper metal element;
   a thermometric element positioned between the lower metal element and the upper metal element in at least one of the MIM structures and comprising at least one thermometric material;

wherein:
the membrane includes at least the upper metal element, the thermometric material and at least one portion of the dielectric element of each of the MIM structures,
the upper metal elements of at least two of the MIM structures have different dimensions relative to each other in a main plane of the membrane,
the dielectric element of each of the MIM structures includes at least one of the following materials having vibrational modes in the LWIR range: $Al_2O_3$, AlN, $TiO_2$, $SiO_2$, SiN, and
the at least one thermometric material is different from the material of the dielectric element of the MIM structures.

2. The bolometric detector according to claim 1, wherein the MIM structures are regularly spaced apart from each other and positioned in order to form an array of MIM structures.

3. The bolometric detector according to claim 2, including four MIM structures positioned so as to form a 2×2 array, and wherein:
the four MIM structures include, in the main plane of the membrane, pairwise similar dimensions, or
each of the four MIM structures includes, in the main plane of the membrane, different dimensions relative to those of the other MIM structures, or
two first ones of the four MIM structures include, in the main plane of the membrane, similar dimensions relative to each other, and two second ones of the four MIM structures include different dimensions relative to each other and different from those of the two first ones of the four MIM structures.

4. The bolometric detector according to claim 1, wherein the dimensions of the MIM structures in the main plane of the membrane are comprised between about 1,000 nm and 2,000 nm.

5. The bolometric detector according to claim 1, wherein the MIM structures are positioned side by side with a pitch comprised between about 2,000 nm and 3,000 nm.

6. A bolometric detector able to detect wavelengths in the long wavelength infrared (LWIR) range, including at least:
a substrate;
a membrane suspended above the substrate by supporting elements;
an absorbing element comprising several MIM structures each formed with a lower metal element, an upper metal element specific to each of the MIM structures and with a dielectric element positioned between the lower metal element and the upper metal element;
a thermometric element comprising at least one thermometric material;
wherein:
the membrane includes at least the upper metal element, the thermometric material and at least one portion of the dielectric element of each of the MIM structures,
the upper metal elements of at least two of the MIM structures have different dimensions relative to each other in a main plane of the membrane,
the dielectric element of each of the MIM structures includes at least one of the following materials having vibrational modes in the LWIR range: $Al_2O_3$, AlN, $TiO_2$, $SiO_2$, SiN, and
wherein the thermometric element is positioned above the MIM structures.

7. The bolometric detector according to claim 1, wherein the membrane further includes, in each of the MIM structures, a first dielectric layer electrically insulating the upper metal element from the thermometric material, and a second dielectric layer electrically insulating the lower metal element from the thermometric material, and wherein the first and second dielectric layers are part of the dielectric element of each of the MIM structures.

8. The bolometric detector according to claim 7, wherein the first and second dielectric layers are common to all the MIM structures and the thermometric material is formed with a layer common to all the MIM structures.

9. The bolometric detector according to claim 1, wherein the membrane includes the lower metal element of each of the MIM structures.

10. The bolometric detector according to claim 1, wherein the lower metal element of each of the MIM structures is positioned on the substrate such that an empty space which is part of the dielectric element of each of the MIM structures is positioned between the membrane and the lower metal element of each of the MIM structures.

11. The bolometric detector according to claim 1, wherein the lower metal elements are formed with at least one metal layer common to all the MIM structures, or the lower metal elements are distinct for each of the MIM structures.

12. The bolometric detector according to claim 1, wherein the thermometric material is electrically connected to an electronic circuit of the substrate through at least one electrically conductive layer of the membrane and through the supporting elements.

13. The bolometric detector according to claim 1, wherein the membrane is mechanically and electrically connected to the supporting elements through thermal insulation arms.

14. A heat detection device including several bolometric detectors according to claim 1, said bolometric detectors being positioned so as to form an array of pixels such that each bolometric detector forms a single pixel of the array.

15. The heat detection device according to claim 14, wherein the bolometric detectors are laid out while forming several sub-arrays, the bolometric detectors of each of said sub-arrays being able to achieve detection of a range of wavelengths different from those intended to be detected by the bolometric detectors of the other sub-array(s).

16. The heat detection device according to claim 14, wherein the array includes at least one baselining bolometric detector including a membrane suspended above the substrate and thermally connected to the substrate.

17. The heat detection device according to claim 14, wherein the array includes at least one reference bolometric detector not including any MIM structure.

18. A bolometric detector able to detect wavelengths in the long wavelength infrared (LWIR) range, including at least:
a substrate;
a membrane suspended above the substrate by supporting elements;
an absorbing element comprising several MIM structures each formed with a lower metal element, an upper metal element specific to each of the MIM structures and with a dielectric element positioned between the lower metal element and the upper metal element;
a thermometric element comprising at least one thermometric material;
wherein:
the membrane includes at least the upper metal element, the at least one thermometric material and at least one portion of the dielectric element of each of the MIM structures, the upper metal elements of at least two of the MIM structures have different dimensions relative to each other in a main plane of the membrane, the dielectric element of each of the MIM structures includes at least one of the following materials having vibrational modes in the LWIR range: $Al_2O_3$, AlN, $TiO_2$, $SiO_2$, SiN, the thermometric element directly contacts the dielectric of the MIM structures, and the at least one thermometric material is different from the material of the dielectric element of the MIM structures.

* * * * *